United States Patent
Kamiyama et al.

(10) Patent No.: US 9,746,121 B2
(45) Date of Patent: Aug. 29, 2017

(54) SPACER FOR POSITIONING A REHABILITATING PIPE

(71) Applicant: SHONAN GOSEI-JUSHI SEISAKUSHO K.K., Kanagawa (JP)

(72) Inventors: Takao Kamiyama, Kanagawa (JP);
Makoto Ishida, Kanagawa (JP);
Takeshi Hasegawa, Kanagawa (JP);
Katsuyori Miura, Kanagawa (JP);
Takashi Okubo, Kanagawa (JP)

(73) Assignee: SHOHAN GOSEI-JUSHI SEISAKISHO K.K. (JP)

( * ) Notice: Subject to any disclaimer, the term of this patent is extended or adjusted under 35 U.S.C. 154(b) by 0 days.

(21) Appl. No.: 15/019,422

(22) Filed: Feb. 9, 2016

(65) Prior Publication Data
US 2016/0238183 A1 Aug. 18, 2016

(30) Foreign Application Priority Data
Feb. 12, 2015 (JP) .................. 2015-025835

(51) Int. Cl.
*F16L 55/18* (2006.01)
*E03F 3/06* (2006.01)
*F16L 55/165* (2006.01)

(52) U.S. Cl.
CPC ............. *F16L 55/18* (2013.01); *E03F 3/06* (2013.01); *F16L 55/1657* (2013.01); *E03F 2003/065* (2013.01)

(58) Field of Classification Search
USPC .............. 138/97, 98, 106, 112; 405/151
See application file for complete search history.

(56) References Cited

U.S. PATENT DOCUMENTS 3,585,270 A * 6/1971 Trump ................. H02G 5/066
174/13
4,161,966 A * 7/1979 Scheffler ............... F16L 59/125
138/112
5,470,178 A * 11/1995 Weholt ................... E21F 16/02
405/150.1

(Continued)

FOREIGN PATENT DOCUMENTS

BE 0379612 5/1931
DE 6950364 7/1971

(Continued)

OTHER PUBLICATIONS

European Search Report mailed Jul. 1, 2016 issued in International Patent Application No. EP 16 15 5086.

*Primary Examiner* — James Hook
(74) *Attorney, Agent, or Firm* — Adams & Wilks

(57) ABSTRACT

A spacer is inserted into a space between an existing pipe and a rehabilitating pipe to adjust a position of the rehabilitating pipe with respect to the existing pipe. The spacer has an elongated shape with both end portions in a longitudinal direction thereof cut off at an oblique angle and has a transverse width increasing gradually from an upper surface portion to a bottom surface portion. A space is formed in the bottom surface portion to correspond to a shape of the upper surface portion, thereby allowing a number of the spacers to be stacked on one another in a thickness direction thereof. The upper surface portion has a flat-plate shape with a flat rectangular surface region.

20 Claims, 9 Drawing Sheets

(56) References Cited

U.S. PATENT DOCUMENTS

| | | | | |
|---|---|---|---|---|
| 6,464,229 | B1* | 10/2002 | Kogler | F16L 5/02 138/108 |
| 7,451,783 | B2* | 11/2008 | Kamiyama | F16L 7/00 138/112 |
| 7,524,387 | B2* | 4/2009 | Kennedy | B63B 9/00 114/360 |
| 2003/0116210 | A1* | 6/2003 | Ishikawa | E21D 11/105 138/97 |
| 2004/0108009 | A1* | 6/2004 | Kamiyama | E03F 3/06 138/97 |
| 2005/0205148 | A1* | 9/2005 | Miura | F16L 55/163 138/98 |
| 2015/0027577 | A1* | 1/2015 | Kamiyama | F16L 55/163 138/97 |
| 2016/0131278 | A1 | 5/2016 | Yamasaki et al. | |

FOREIGN PATENT DOCUMENTS

| | | |
|---|---|---|
| JP | 8277992 | 10/1996 |
| JP | 4392275 | 10/2009 |
| WO | 2011162886 | 12/2011 |
| WO | 2014199706 | 12/2014 |

* cited by examiner

SPACER FOR POSITIONING A REHABILITATING PIPE

TECHNICAL FIELD

The present invention relates to a spacer for positioning which is inserted into a space between an existing pipe and a rehabilitating pipe that repairs or renovates the existing pipe and which performs positioning of the rehabilitating pipe.

BACKGROUND ART

A method of rehabilitating an existing pipe is known. This method includes providing a rehabilitating pipe in an existing pipe, such as a sewage pipe. The rehabilitating pipe has an outer diameter that is somewhat smaller than the inner diameter of the existing pipe. The method further includes filling a space between the outer circumference of the rehabilitating pipe and the inner wall surface of the existing pipe with a filling material and curing the filling material to build a composite pipe. The existing pipe can thus be repaired or renovated. In the existing pipe renovation work, the position of the rehabilitating pipe may usually be adjusted from side to side and up and down in the existing pipe, and the rehabilitating pipe may have to be positioned and fixed to a position at which the rehabilitating pipe is shifted somewhat downward from the concentric position with the existing pipe and the lower end of outer circumference of the rehabilitating pipe is in the contact with the pipe bottom of the existing pipe.

This is because the pipe bottom of the rehabilitating pipe should come close to the pipe bottom of the existing pipe as much as possible to ensure the flow of a fluid in the existing pipe and also because damage of the existing pipe largely occurs at the upper portion thereof and the filling material should have a large thickness at the upper portion to enhance the strength. However, the rehabilitating pipe may be made of a plastic material of which the specific gravity is smaller than that of the filling agent, and the rehabilitating pipe will float on the filling agent. Therefore, positioning of the rehabilitating pipe may have to be performed as the above such that the rehabilitating pipe is pushed down to a certain position.

For the purpose of such positioning of the rehabilitating pipe, a method has conventionally been employed in which a rectangular material processed to be a spacer having a necessary height (thickness) is inserted and interposed between the outer circumference of the rehabilitating pipe and the inner wall surface of the existing pipe. In addition, Patent Document 1 discloses a spacer comprising: a first wedge-like member configured to be slanted at a certain angle such that the height increases as the position comes close to the back side in the insertion direction; and a second wedge-like member configured to be slanted at the same angle as the slant angle of the first wedge-like member and to lay on the first wedge-like member such that the slanted surfaces are in contact with each other.

PRIOR ART DOCUMENT

Patent Document

[Patent Document 1] U.S. Pat. No. 4,392,275

SUMMARY OF THE INVENTION

Problems to be Solved by the Invention

According to the above method of using a rectangular material as the spacer, however, various types of rectangular materials with respective heights may have to be prepared in accordance with the dimensions of the space between the outer circumference of the rehabilitating pipe and the inner wall of the existing pipe, which may be problematic. On the other hand, according to the technique as described in Patent Document 1, the second wedge-like member may be moved with respect to the first wedge-like member in the insertion direction thereby to allow the height of the spacer as a whole to be easily adjusted. Moreover, a raising member may be additionally used to respond to a substantial height. Thus, this technique may solve, to some extent, the problem in the method of using a rectangular material, but may not be suitable for the positioning when the space between the outer circumference of the rehabilitating pipe and the inner wall of the existing pipe is relatively narrow and also for the positioning at a location with a long length, because the height adjustment is performed using a combination of two or more members. In some situations, the positioning may have to be performed such that the rehabilitating pipe is moved upward in the existing pipe, but the space between the outer circumference of the rehabilitating pipe and the inner wall of the existing pipe at the lower side of the rehabilitating pipe may sometimes be narrower than that in usual cases, and the spacer as described in Patent Document 1 may not be used in such situations.

When the rehabilitating pipe is assembled in the existing pipe, pipe units may be connected with one another via connecting members in the pipe length direction thereby to lay down the rehabilitating pipe in the existing pipe. Each pipe unit may be assembled by connecting segments with one another along the circumferential direction. Each segment may comprise: an inner surface plate that provides the inner circumferential surface; and side plates and end plates provided to stand at the peripheral border of the inner surface plate, and these plates may be integrally formed using plastic. In this operation, when a newly prepared pipe unit is pushed into the existing pipe so as to be connected with pipe units that have already been laid down, a problem may also arise in that it is difficult to push the newly prepared pipe to a location at which the space is narrow between the outer circumference of the rehabilitating pipe and the inner wall of the existing pipe.

The present invention has been created in view of such circumstances, and an object of the present invention is to provide a spacer for positioning a rehabilitating pipe by which the positioning of the rehabilitating pipe in an existing pipe can be easily and appropriately performed in a short time during the existing pipe regeneration work even when the space is narrow between the outer circumference of the rehabilitating pipe and the inner wall of the existing pipe and which can be utilized as a guide when assembling the rehabilitating pipe in the existing pipe.

To achieve the above object, the present invention provides a spacer for positioning a rehabilitating pipe that renovates an existing pipe, the spacer being inserted into a space between the existing pipe and the rehabilitating pipe and adjusting a position of the rehabilitating pipe with respect to the existing pipe, the spacer having an elongated shape with both end portions in a longitudinal direction cut off at an angle, the spacer having a transverse width increasing gradually from an upper surface portion to a bottom surface portion and a space formed in the bottom surface portion to correspond to a shape of the upper surface portion, thereby allowing a plurality of the spacers to be stacked on one another in a thickness direction (Invention 1).

The above invention (Invention 1) has features that the transverse width increases gradually from the upper surface portion to the bottom surface portion and that the space is formed in the bottom surface portion to correspond to the shape of the upper surface portion. According to the features, a plurality of the spacers can be stacked on one another in the thickness direction so that the upper surface portion of a spacer located at the lower side is fitted in the bottom surface portion of another spacer located at the upper side. Therefore, by adjusting the number of spacers to be stacked in accordance with the size of the space between the outer circumference of the rehabilitating pipe and the inner wall of the existing pipe, the positioning of the rehabilitating pipe in the existing pipe can be easily and appropriately performed in a short time during the existing pipe regeneration work. Moreover, during the operation of assembling the rehabilitating pipe in the existing pipe, when a newly prepared pipe unit is pushed into the existing pipe, the pipe unit may not get stuck with the spacer because the both end portions in the longitudinal direction are cut off at an angle. Furthermore, the elongated shape of the spacer itself can guide the motion of the pipe unit being pushed into the existing pipe, and the rehabilitating pipe can be smoothly assembled in the existing pipe.

In the above invention (Invention 1), it may be preferred that, when a plurality of the spacers are stacked on one another in the thickness direction, the spacers are stacked such that skirt portions located at both end portions in the transverse direction of the bottom surface portion of a spacer at an upper side for positioning will cover the upper surface portion of a spacer at a lower side for positioning and at least a part of a side surface portion of the spacer at the lower side for positioning (Invention 2).

According to the above invention (Invention 2), when a plurality of the spacers are stacked on one another, the upper surface portion and side surface portion of the spacer at the lower side for positioning can be smoothly accommodated and fit in the space formed in the bottom surface portion of the spacer at the upper side for positioning.

In the above invention (Invention 1, 2), it may be preferred that a direction in which one end portion of the both end portions in the longitudinal direction is cut off at an angle is parallel to a direction in which the other end portion is cut off at an angle (Invention 3). In the above invention (Invention 3), it may be preferred that a boss portion is formed on a cut surface of the one end portion, and a recessed portion is formed at a cut surface of the other end portion to be fitted with the boss portion (Invention 4).

According to the above invention (Invention 3, 4), a plurality of the spacers for positioning can be connected with one another in the longitudinal direction, and the spacers can thus be more effectively utilized as a guide when assembling the rehabilitating pipe in the existing pipe.

According to the spacer for positioning a rehabilitating pipe of the present invention, the positioning of the rehabilitating pipe in the existing pipe can be easily and appropriately performed in a short time during the existing pipe regeneration work even when the space is narrow between the outer circumference of the rehabilitating pipe and the inner wall of the existing pipe. Moreover, the spacer for positioning a rehabilitating pipe of the present invention can also be utilized as a guide when assembling the rehabilitating pipe in the existing pipe.

DETAILED DESCRIPTION OF THE EMBODIMENTS

Hereinafter, the present invention will be described with reference to a working example shown in the appended drawings. The present invention is suitable for renovating or repairing large diameter existing pipes, such as sewage pipes, clean water pipes, tunnels, and agricultural pipelines. In the present working example, the rehabilitating pipe is described as having a circular cross-sectional shape orthogonal to the pipe length direction, but it will be understood that the present invention can also be applied to renovation pipes having other cross-sectional shapes than the circular shape, such as a rectangular shape. The present invention can be applied not only to pipes having a closed cross-sectional shape but also to those having a half opened cross-sectional shape, such as a horseshoe shape, semicircular shape, and recessed shape, because they can also be considered as pipes.

Figure 3:
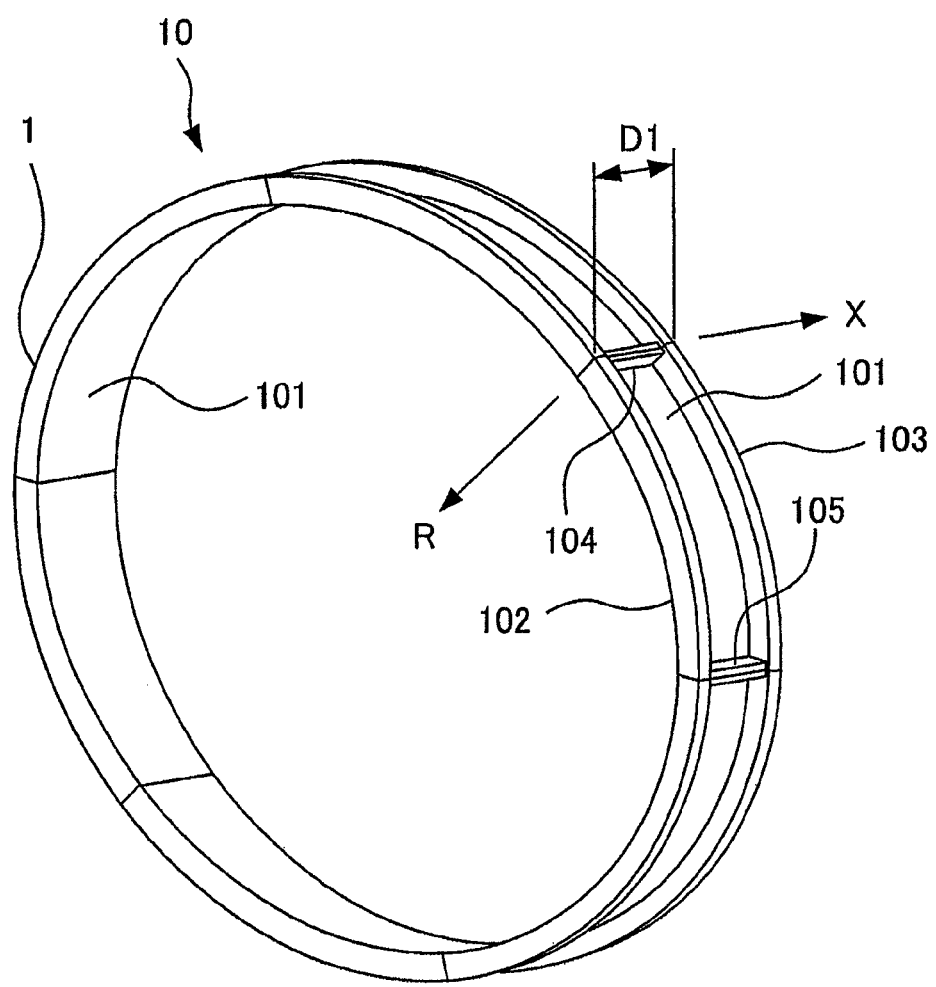
FIG. 3 is a perspective view showing a state in which the segments are connected with one another along the circumferential direction to assemble a pipe unit.
Figure 6:
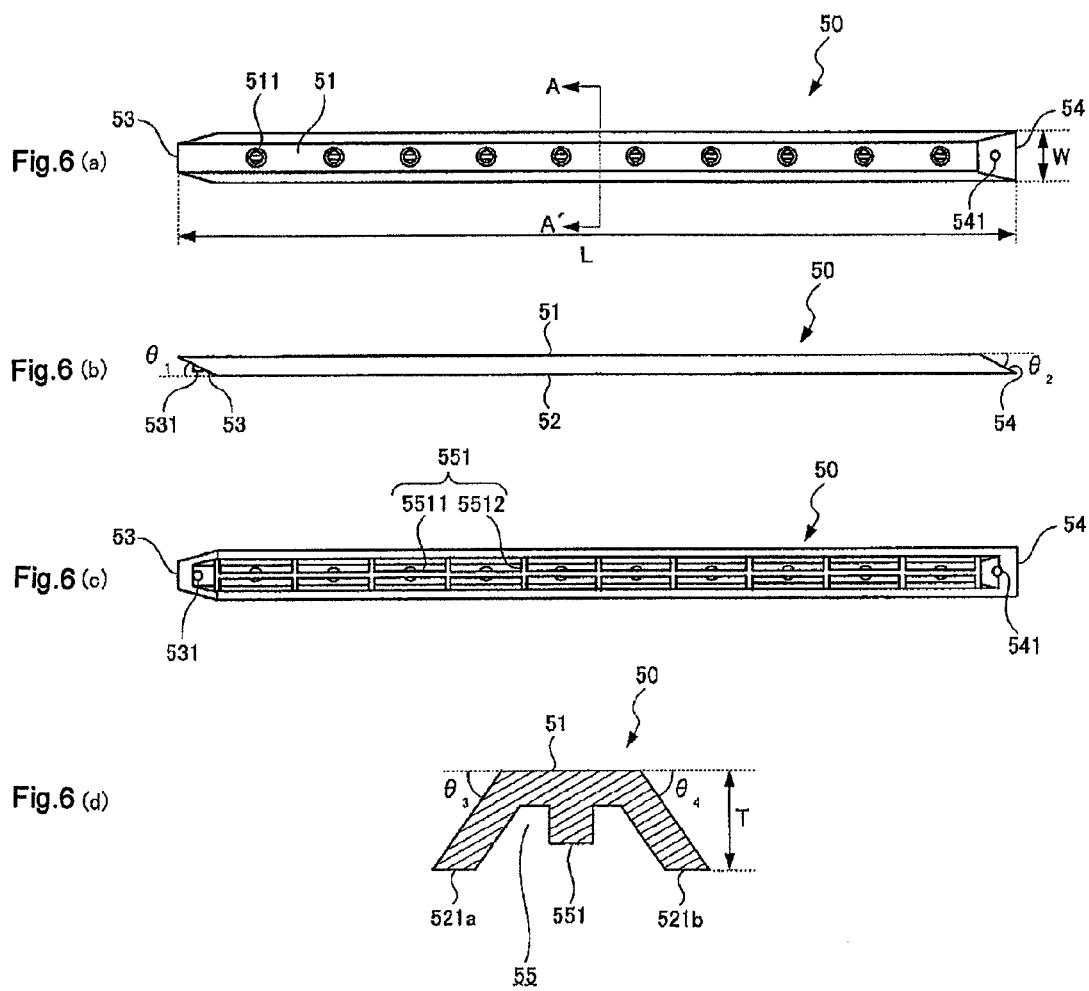
FIG. 6($a$) is a plan view when the spacer is viewed from above, FIG. 6($b$) is a side elevational view when the spacer is viewed from a side, FIG. 6($c$) is a back view when the spacer is viewed from below, and FIG. 6($d$) is a cross-sectional view in the longitudinal direction.

The terms "pipe length direction," "radial direction," and "circumferential direction" as used herein refer respectively to a direction, shown as arrow X in FIG. 3, extending in the length direction of a pipe unit 10, a radial direction, shown as arrow R, directed toward the central axis of the pipe unit 10, and a circumferential direction of the circle of the pipe unit 10. The terms "longitudinal direction," "transverse direction," and "thickness direction" refer respectively to a direction represented by the length L of a spacer 50 in FIG. 6, a direction represented by the length W, and a direction represented by the length T.

[Working Example]

Figure 1:
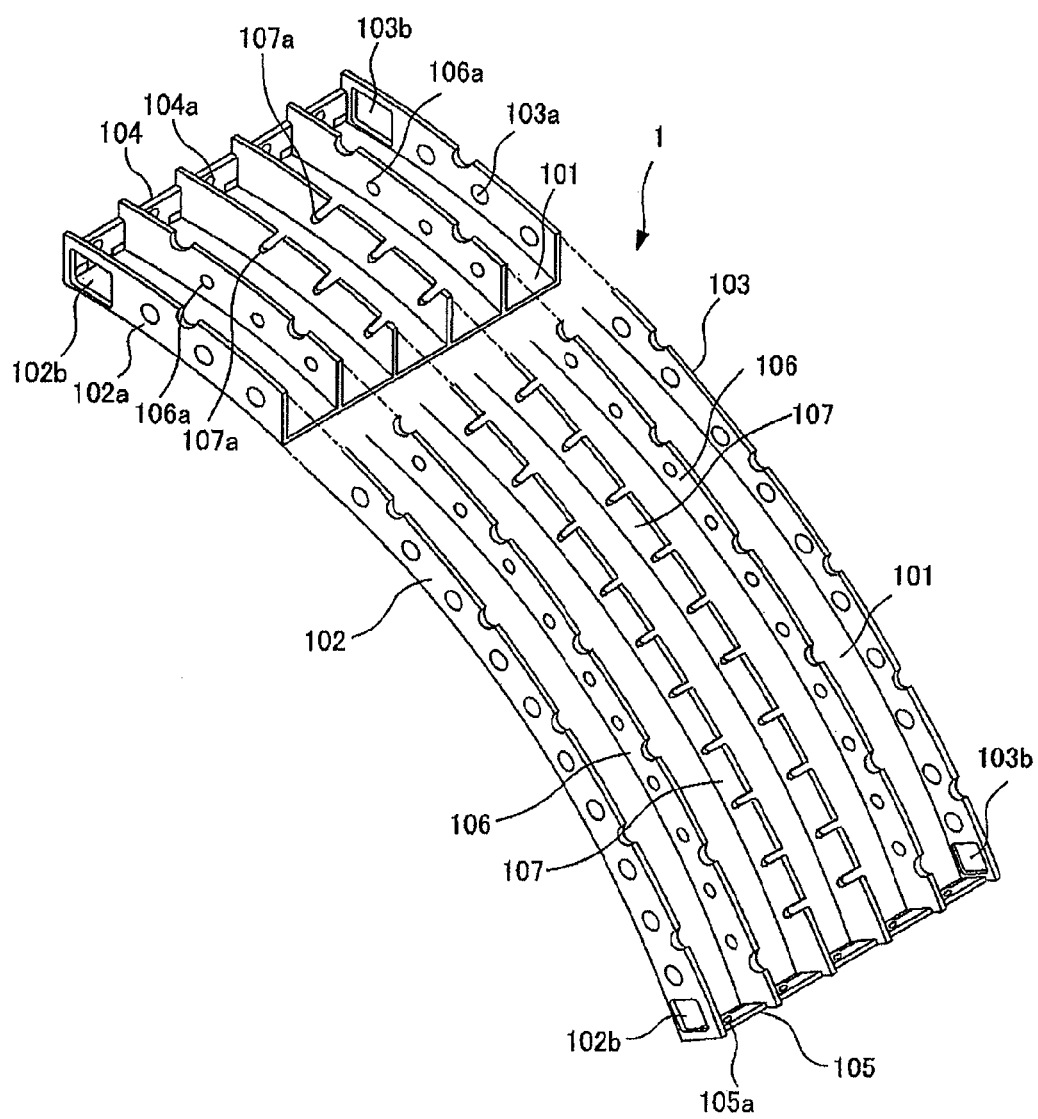
FIG. 1 is a perspective view showing a structure of a segment used to assemble a rehabilitating pipe.

FIG. 1 shows the structure of a rehabilitating pipe segment (referred simply to as a "segment," hereinafter) 1 which is an assembly unit member of a rehabilitating pipe for renovating an existing pipe. The segment 1 may be a block-like member made of plastic through integral molding and may comprise: an inner surface plate 101 that provides the inner circumferential surface of the rehabilitating pipe; side plates 102 and 103 of the same shape that extend along the circumferential direction of the inner surface plate 101 and are provided to perpendicularly stand at both sides; and end plates 104 and 105 of the same shape that extend in the pipe length direction of the inner surface plate 101 and are provided to perpendicularly stand at both ends.

In the present working example, the segment 1 may have a curved shape of a circular arc with a predetermined angle that divides the circumference into equal parts, e.g. an angle of 60 degrees which divides the circumference into six equal parts. The shape of the segment is not limited to a circular arc shape or sector shape, and any suitable shape may be employed, such as shapes of a rectangular cuboid or rounded and folded shapes in accordance with the cross-sectional shape or size of the existing pipe or the location to be repaired of the existing pipe.

To enhance the mechanical strength of the segment 1, the upper surface of the inner surface plate 101 may be formed with a plurality of interior plates 106 and 107, in the present working example four interior plates 106 and 107, which have similar shapes to those of the side plates 102 and 103 and are provided inside the side plates 102 and 103 at regular intervals to stand parallel to the side plates 102 and 103. If the strength of the segment 1 is sufficient, either or both of the interior plates 106 and 107 can be omitted.

The side plates 102 and 103 may be formed with pluralities of circular insertion holes 102a and 103a through which connecting members 11 and nuts 12 (shown in FIG. 4) are to pass and which are provided at regular intervals along the circumferential direction. The connecting members 11 may be constituted as bolts for connecting the segments 1 in the pipe length direction. Positions of the insertion holes 102a of the side plate 102 along the circumferential direction may coincide with those of the insertion holes 103a of the side plate 103.

End portions of the side plates 102 and 103 along the circumferential direction may be formed with opening portions 102b and 103b for being utilized for work of connecting the segments 1 along the circumferential direction. When connecting the segments 1 with one another along the circumferential direction, the worker or operator can set and/or tighten up the connecting members such as bolts/nuts via the opening portions 102b and 103b.

The end plates 104 and 105, which are members disposed between the side plates 102 and 103, may be formed with pluralities of circular insertion holes 104a and 105a through which connecting members such as bolts for connecting the segments 1 along the circumferential direction are to pass.

The interior plates 106 may be thin plate members of which the external shapes are substantially the same as those of the side plates 102 and 103, and the lower portion of each interior plate 106 may be formed with a plurality of circular insertion holes 106a through which the connecting members 11 (shown in FIG. 4) for connecting the segments 1 in the pipe length direction are to pass and which are provided at regular intervals. Positions of the insertion holes 106a along the circumferential direction may coincide with those of the insertion holes 102a and 103a of the side plates 102 and 103.

The interior plates 107 may be thin plate members of which the external shapes are substantially the same as those of the side plates 102 and 103, and each interior plate 107 may be formed with a plurality of notches. Lower areas of the notches may function as semicircular-shaped insertion holes 107a in which the connecting members can be inserted, and the positions thereof along the circumferential direction may coincide with those of the insertion holes 102a, 103a and 106a of the side plates 102 and 103 and interior plates 106.

All of the inner surface plate 101, side plates 102 and 103, and interior plates 106 and 107 may be made of the same transparent, semitransparent or opaque plastic, and can be integrally molded using a known molding technique.

Figure 2A:
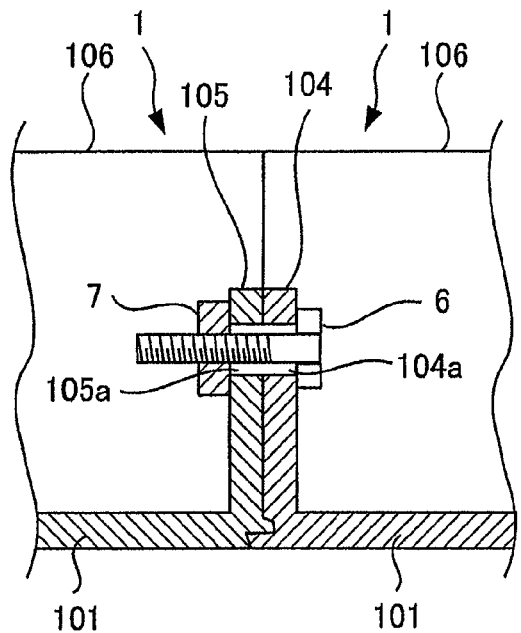
FIG. 2($a$) is a cross-sectional view showing a connection structure of the segments along the circumferential direction and FIG. 2($b$) is a front elevational view thereof.
Figure 2B:
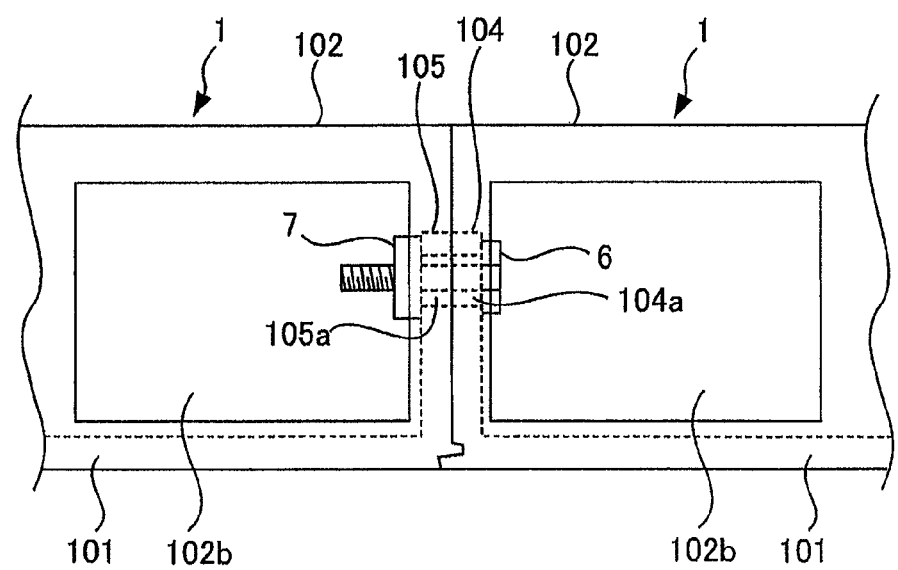

FIGS. 2(*a*) and 2(*b*) are views for explaining a method of connecting the segments 1 along the circumferential direction. Two segments 1 may be held such that the end plate 105 of one segment comes into contact with the endplate 104 of the other segment, and a bolt 6 is inserted in the insertion holes 104a and 105a via the opening portion 102b of the side plate 102 of a segment and screwed into a nut 7. Both the end plates 104 and 105 can thus be tightened up with each other thereby to connect the two segments along the circumferential direction.

Such bolt tightening may be performed at each of two locations, i.e. between the side plate 102 and the adjacent interior plate 106 and between the side plate 103 and the adjacent interior plate 106. If the connections at these two locations cannot provide sufficient connection strength, connections at three or more locations may be performed to enhance the connection along the circumferential direction.

After the segments 1 are connected in turn with one another to go round, a short pipe body (referred to as a "pipe unit," hereinafter) 10 can be assembled which has a short length and is in a ring-like closed form as shown in FIG. 3. The pipe unit 10 may have a shape obtained when cutting a circular pipe orthogonally to the pipe length direction X into round slices of a predetermined width D1, and the outer diameter of the pipe unit 10 maybe a somewhat smaller value than the inner diameter of the existing pipe to renovate. The segments 1 correspond to members obtained when dividing the pipe unit 10 into a plurality of parts (preferably equal parts) along the circumferential direction and at cutting surfaces along the radial direction R.

FIG. 3 shows the inner surface plates 101, side plates 102 and 103, and end plates 104 and 105 which are main structural members of the segments 1, and the reinforcement structures such as the interior plates 106 and 107 are omitted to be shown for simple illustration.

Figure 4:
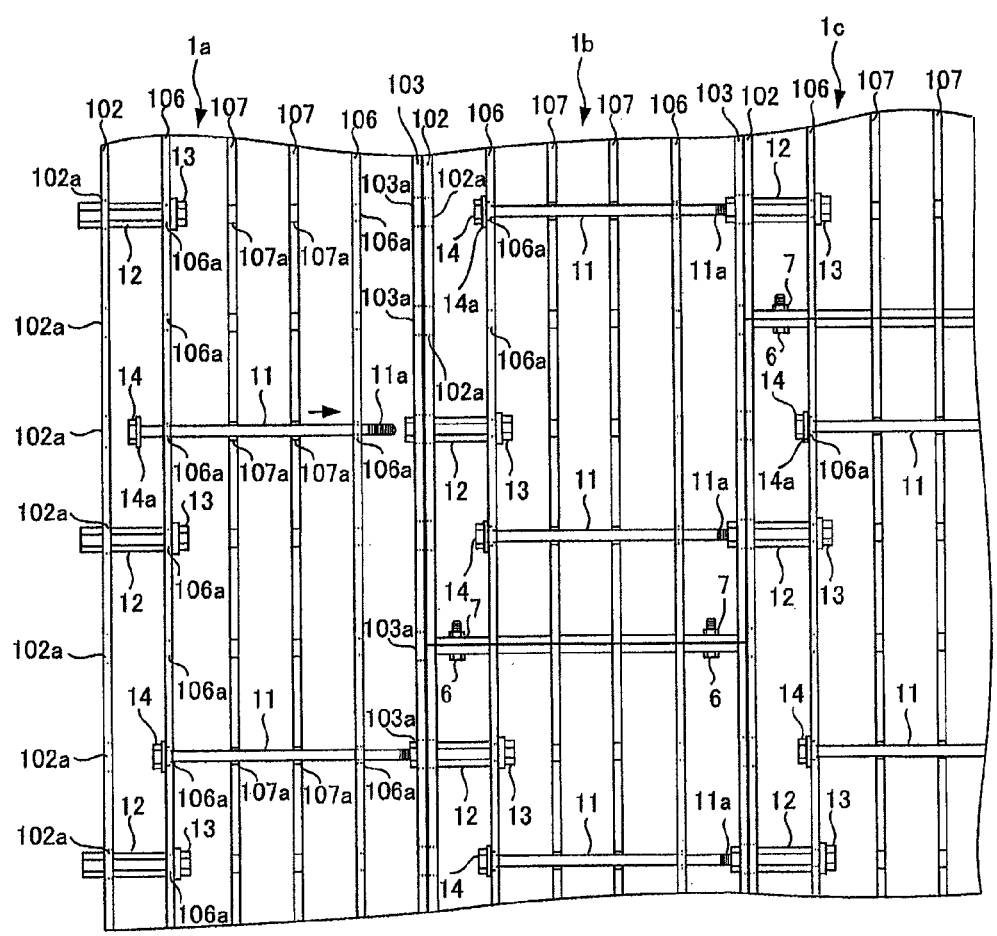
FIG. 4 is an explanatory view showing a state in which the segments of the pipe units are connected with one another in the pipe length direction.

The pipe unit 10 having such a structure maybe extended in the pipe length direction such that, as shown in FIG. 4, each segment is connected with a corresponding segment of another pipe unit using the connecting members 11 and nuts 12 extending in the pipe length direction.

When the segments are connected with one another in the pipe length direction, a plurality of metallic nuts 12 may be fixed to the side plate at one side of each segment. As shown in FIG. 4, the nuts 12 may be inserted in the insertion holes 102a of the side plate 102 at one side of each of the segments 1a, 1b, and 1c to come into contact with the adjacent interior plate 106, and in this state the bolts 13 may be screwed into the nuts 12 from the opposite side of the interior plate 106 thereby to fix the nuts 12 to the interior plate 106. The nuts 12 may have a length in the pipe length direction longer than the distance between the side plate 102 and the interior plate 106 so as to project from the side plate 102 to or beyond the thickness of the side plate 103 of another segment.

Each connecting member 11 may be constituted as a metallic bolt of which one end is formed with a screw portion 11a to be screwed into each nut 12 and the other end is fixed with a head portion 14 having a flange 14a.

FIG. 4 shows a state in which the connecting members 11 are screwed into the nuts 12 thereby to connect the segments 1b and 1c with each other in the pipe length direction. When the segment 1a is connected with the segment 1b, the nuts 12 projecting from the sideplate 102 of the segment 1b may be caused to pass through the holes 103a of the side plate 103 of the segment 1a as shown in the figure so that the side plates 103 and 102 of both the segments 1a and 1b abut on each other.

Subsequently, the connecting members 11 maybe caused to pass through the insertion holes 102a of the segment la, the insertion holes 106a of the interior plates 106, and the notches 107a of the interior plates 107 to screw the screw portions 11a into the nuts 12 fixed to the segment 1b. This allows the connecting members 11 to be connected with the nuts 12. Thereafter, the connecting members 11 may be further screwed into the nuts 12 until the flanges 14a of the head portions 14 are pressed against the leftmost interior plate 106, so that both the segments 1a and 1b are fixed to each other by bolt tightening.

A plurality of the nuts 12 may be fixed to one segment along the circumferential direction, e.g. for every two or every three or more holes 102a provided in the side plate 102, in accordance with the required strength.

In this manner, by connecting the segments of each pipe unit with the segments of another pipe unit in the pipe length direction, the pipe units can be connected with one another to have an arbitrary length to build up a rehabilitating pipe comprising the pipe units or segments.

Descriptions will now be directed to a method of renovating an existing pipe using the segments 1 having the above structure.

Figure 5:
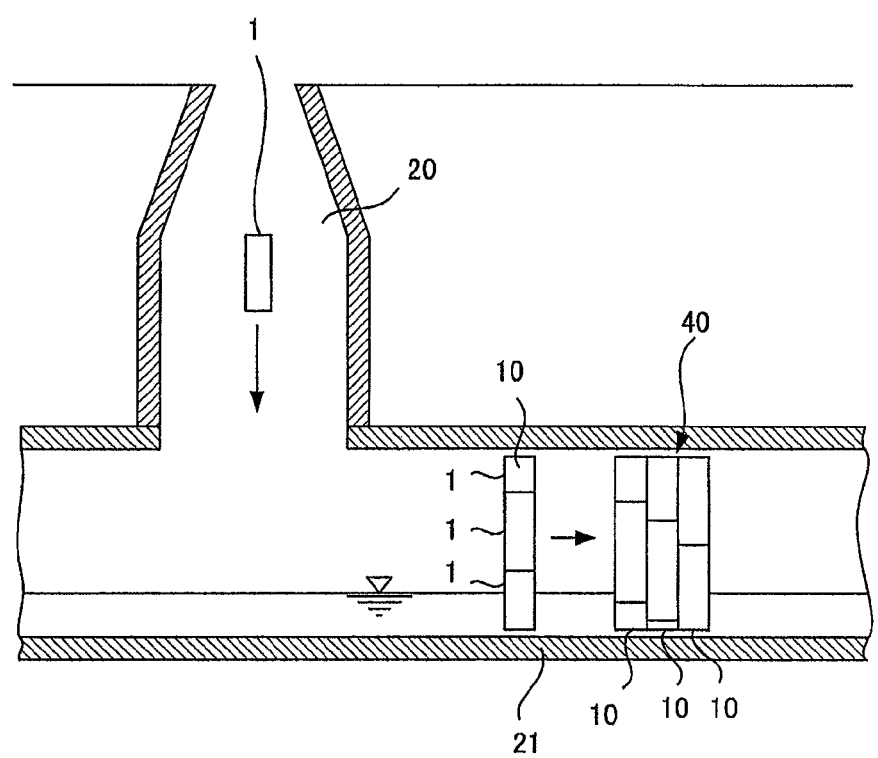
FIG. 5 is an explanatory view for explaining a state in which the pipe units are assembled to lay down a rehabilitating pipe in an existing pipe.

First, as shown in FIG. 5, the segments 1 may be carried into an existing pipe 21 via a manhole 20, and each pipe unit 10 may be assembled by connecting the segments 1 in turn with one another along the circumferential direction, as shown in FIG. 2 and FIG. 3.

Subsequently, the pipe units 10 may be connected in turn with one another in the pipe length direction using the connecting members 11 and nuts 12 in the method as described with reference to FIG. 4 to lay down the rehabilitating pipe 40 in the existing pipe 21.

As previously described, the laid rehabilitating pipe 40 may float on a filling agent because the rehabilitating pipe 40 is made of a plastic material of which the specific gravity is smaller than that of the filling agent. Therefore, positioning of the rehabilitating pipe 40 may have to be performed such that the rehabilitating pipe 40 is pushed down to a position at which the rehabilitating pipe 40 is shifted somewhat downward from the concentric position with the existing pipe 21 and the lower end of the outer circumference of the rehabilitating pipe 40 is in contact with the pipe bottom of the existing pipe 21. For this reason, in the present working example, when a plurality of the pipe units 10 are connected with one another to assemble the rehabilitating pipe 40, spacers 50 having an elongated shape as shown in FIGS. 6(a) to 6(d) may be used for positioning of the rehabilitating pipe 40 such that the spacers 50 are inserted between the outer circumference of the rehabilitating pipe 40 and the inner wall surface of the existing pipe 21 at a plurality of locations on the upper outer circumference of the rehabilitating pipe 40. One spacer 50 may be inserted as a single body, or otherwise a plurality of the spacers 50 may be stacked on one another and inserted, depending on the location.

As shown in FIGS. 6(a) to 6(d), each spacer 50 may be a rod-like member that has an elongated shape as a whole and is in a shape of a trapezoidal column in which the transverse width increases gradually from an upper surface portion 51 to a bottom surface portion 52. Both end portions 53 and 54 of the spacer 50 may be cut off at an angle. The bottom surface portion 52 may be provided with a space 55 having a shape corresponding to the upper surface portion 51 so that, when two or more spacers 50 are stacked on one another, the upper surface portion 51 of a spacer 50 located at the lower side can be fitted in the bottom surface portion 52 of another spacer 50 located at the upper side. In the present working example, the length L in the longitudinal direction, length (width) W in the transverse direction, and length (thickness) T in the thickness direction of the spacer 50 may be, but are not limited to, 440 mm, 26.5 mm, and 10 mm, respectively, and it may be enough if the spacer 50 has dimensions that allow the spacer 50 to be recognized as a rod-like member having an elongated shape in general.

As shown in FIG. 6(a), the upper surface portion 51 may have a flat-plate shape with a flat rectangular region at the upper surface. The upper surface portion 51 may be formed with a plurality of circular holes 511 that pass therethrough into the space 55 formed at the side of the bottom surface portion 52. In the present working example, ten circular holes 511 may be provided at regular intervals and in apposition with one another.

The direction in which one end portion 53 of both end portions in the longitudinal direction of the spacer 50 is cut off at an angle may be parallel to the direction in which the other end portion 54 is cut off at an angle. Specifically, as shown in FIG. 6(b), the end portion 53 may be cut off at an angle such that the side of the upper surface portion 51 remains long, while the end portion 54 may be cut off at an angle such that the side of the bottom surface portion 52 remains long, and the angle $\theta_1$ at which the end portion 53 is cut off may be equal to the angle $\theta_2$ at which the end portion 54 is cut off. The end portion 53 may be provided with a connection boss 531, while the end portion 54 may be provided with a connection recess 541 having a shape in which the connection boss 531 can fit. The connection boss 531 and connection recess 541 may function as positioning guides when two spacers 50 are connected with each other in the longitudinal direction, and may also function as means for maintaining the connection state.

As shown in FIG. 6(d), the bottom surface portion 52 may be formed with a space 55 having a shape such that a trapezoidal column inside the spacer 50 is removed from the side of the bottom surface portion 52. That is, the spacer 50 may be composed of an upper surface portion 51 having a flat-plate shape in general and two skirt members 521a and 521b extending downward at an angle from the upper surface portion 51, and the space 55 may be defined as a shape surrounded by the upper surface portion 51 and the skirt members 521a and 521b. The skirt member 521a may be provided to extend from the upper surface portion 51 in a direction in which the skirt member 521a is slanted at an angle $\theta_3$, while the skirt member 521b may be provided to extend from the upper surface portion 51 in a direction in which the skirt member 521b is slanted at an angle $\theta_4$, and the angle $\theta_3$ may be equal to the angle $\theta_4$.

As shown in FIG. 6(c), reinforcement ribs 551 may be provided in the space 55 for the purpose of enhancing the stiffness of the spacer 50. The reinforcement ribs 551 may comprise a longitudinal rib 5511 that extends from the end portion 53 to the end portion 54 and a plurality of transverse ribs 5512 that are orthogonal to the longitudinal rib 5511. In the present embodiment, one longitudinal rib 5511 may be provided along the central axis with respect to the transverse direction, and eleven transverse ribs 5512 may be provided at regular intervals. This arrangement allows each circular hole 511 to be positioned at the center between adjacent two transverse ribs 5512 when viewed from the side of the bottom surface portion 52. As will be understood, the reinforcement ribs 551 may be appropriately provided in accordance with the material and necessary stiffness of the spacer 50.

Figure 7:
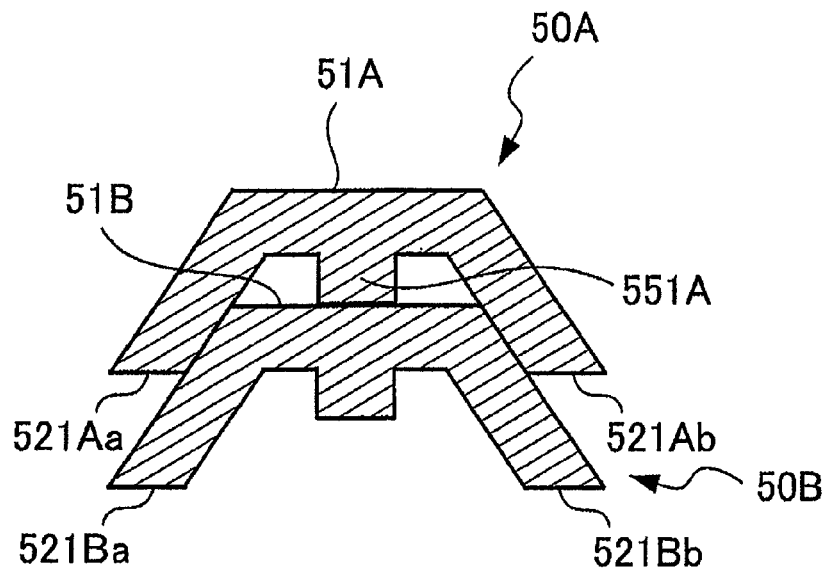
FIG. 7 is an explanatory cross-sectional view showing a state in which a plurality of the spacers according to the working example are stacked to be used.

The spacer 50 of the present working example may be configured as described above such that the transverse width increases gradually from the upper surface portion 51 to the bottom surface portion 52 and the bottom surface portion 52 is formed with the space 55 having a shape corresponding to the upper surface portion 51, thereby to allow a plurality of the spacers 50 to be used in a stack. For example, when two spacers 50 are stacked in the thickness direction as shown in FIG. 7, they may be stacked such that skirt portions located at both end portions in the transverse direction of the bottom surface portion 52A of a spacer 50A at the upper side, i.e. skirt members 521Aa and 521Ab, cover the upper surface portion 51B of an spacer 50B at the lower side and areas of skirt members 521Ba and 521Bb near the upper surface portion 51B. In this state, the upper surface portion 51B of the spacer 50B at the lower side may be in contact with a reinforcement rib 551a provided in a space 55(FIG. 6(d)) of the spacer 50A at the upper side, and the areas of the skirt members 521Ba and 521Bb of the spacer 50B at the lower side near the upper surface portion 51B may be in contact with the insides of the skirt members 521Aa and 521Ab of the spacer 50A at the upper side. In this operation, the outer circumference surface as a whole of a plurality of the spacers 50 may be wrapped with a tape or the like so that the state of the spacers 50 stacked on one another will not collapse.

Figure 8:
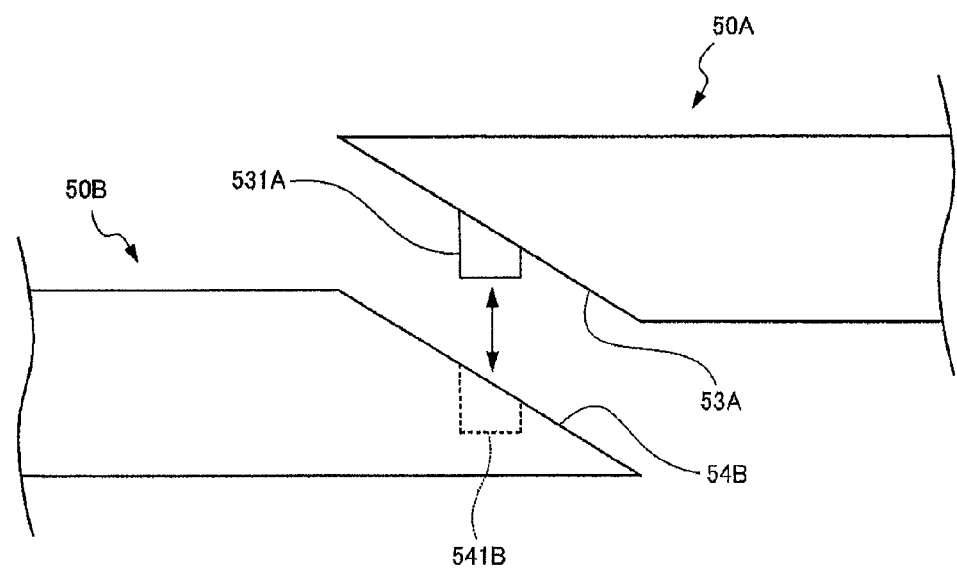
FIG. 8 is an explanatory view showing a state in which a plurality of the spacers according to the working example are connected to be used.

As described above, the spacer 50 of the present working example may have features that the both end portions 53 and 54 in the longitudinal direction are cut off at an angle and that the direction in which one end portion 53 is cut off at an angle is parallel to the direction in which the other end portion 54 is cut off at an angle. According to the features, a plurality of the spacers 50 can be connected with one another for use. For example, as shown in FIG. 8, when two spacers 50 are connected with each other in the longitudinal direction such that the end portion 53A of one spacer 50A is connected with the end portion 54B of the other spacer 50B, the connection boss 531A of the end portion 53A of the one spacer 50A may fit in the connection recess 541B of the end portion 54B of the other spacer 50B, and the connected state of the two spacers 50A and 50B can thus be maintained. In this operation, after a plurality of the spacers 50 are fixed to one another to maintain the connected state using a tape or the like, the spacers 50 may be inserted into a space between the inner wall surface of the existing pipe 21 and the outer circumference surface of the rehabilitating pipe 40.

When the positioning of the rehabilitating pipe 40 is performed using the above spacers 50, one spacer 50 may be inserted into the space between the inner wall surface of the existing pipe 21 and the outer circumference of the rehabilitating pipe 40, or a plurality of the spacers 50 may be stacked and inserted into the space, in accordance with the size of the space. In such a manner, by adjusting the number of spacers to be stacked in accordance with the size of the space between the outer circumference of the rehabilitating pipe 40 and the inner wall surface of the existing pipe 21, the positioning of the rehabilitating pipe 40 in the existing pipe 21 can be easily and appropriately performed in a short time during the existing pipe regeneration work. The spacer or spacers 50 may be inserted such that the upper surface portion 51 is located at the side of the outer circumference of the rehabilitating pipe 40 while the bottom surface portion 52 is located at the side of the inner wall surface of the existing pipe 21.

Figure 9A:
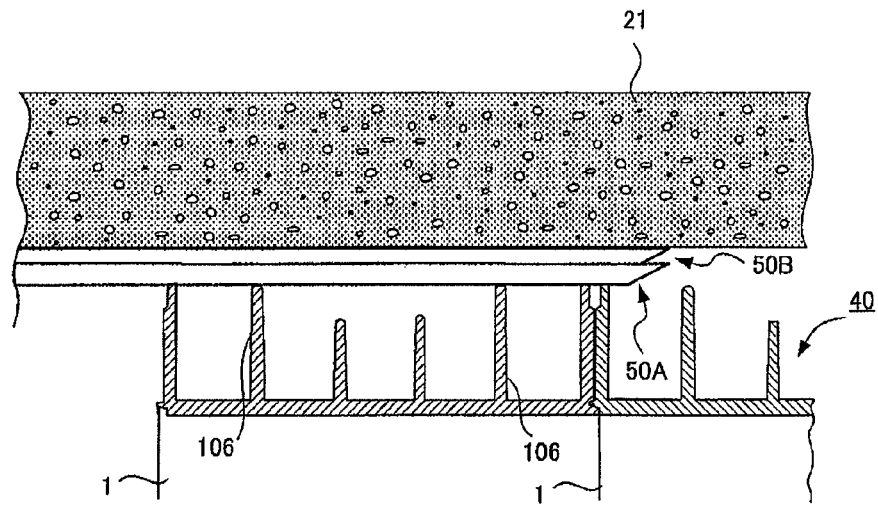
FIG. 9($a$) is an explanatory view showing an appearance when two spacers are stacked and inserted to perform positioning of the rehabilitating pipe, FIG. 9($b$) is an explanatory view showing an appearance when one spacer is inserted to perform positioning of the rehabilitating pipe, and FIG. 9($c$) is an explanatory view showing an appearance when one spacer is inserted in the opposite direction to that of FIG. 9($b$) to perform positioning of the rehabilitating pipe.

When a plurality of the spacers 50, e.g. two spacers 50, are stacked and inserted, the two stacked spacers 50 may be inserted into the space between the inner wall surface of the existing pipe 21 and the outer circumference of the rehabilitating pipe 40, as shown in FIG. 9(a). When only one spacer 50 is inserted, the spacer 50 may also be inserted into the space between the inner wall surface of the existing pipe 21 and the outer circumference of the rehabilitating pipe 40, but the end portion 53 may lead as shown in FIG. 9(b), or the end portion 54 may lead as shown in FIG. 9(c).

Figure 9B:
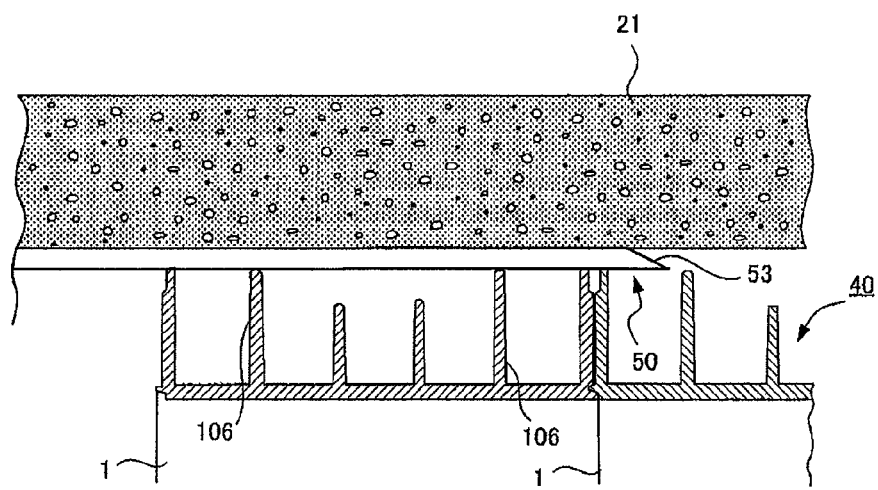
Figure 9C:
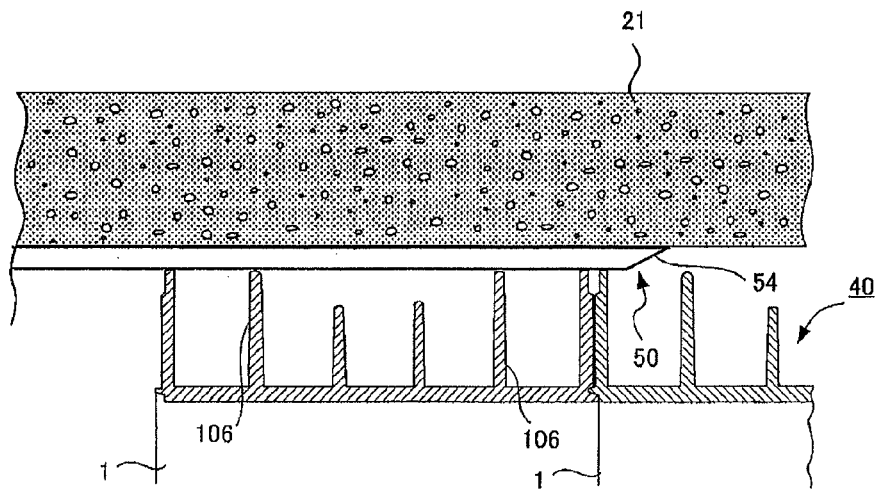

As shown in FIG. 9(b), when the spacer 50 is inserted with the end portion 53 leading, the tip of the end portion 53 is located at the side of the outer circumference of the rehabilitating pipe 40. Therefore, the space between the inner wall surface of the existing pipe 21 and the outer circumference of the rehabilitating pipe 40 may be expanded using a bar or the like (not shown), and the spacer 50 may be inserted into the expanded space. When the spacer 50 is inserted with the end portion 53 leading in this manner, the end portion 54 is located at the side of the inner wall surface of the existing pipe 21. Therefore, when the newly prepared pipe unit 10 is pushed into the existing pipe 21, the pipe unit 10 may not get stuck with the spacer 50. In addition, the elongated shape of the spacer 50 itself can guide the motion of the pipe unit 10 being pushed into the existing pipe 21, and the rehabilitating pipe 40 can be smoothly assembled in the existing pipe 21.

On the other hand, when the spacer 50 is inserted with the end portion 54 leading as shown in FIG. 9 (c), the tip of the end portion 54 is located at the side of the inner wall surface of the existing pipe 21. Therefore, by inserting and pushing the tip into the space between the inner wall surface of the existing pipe 21 and the outer circumference of the rehabilitating pipe 40, the spacer 50 itself may be inserted while expanding the space between the inner wall surface of the existing pipe 21 and the outer circumference of the rehabilitating pipe 40. Thus, when the spacer 50 is inserted with the end portion 54 leading, an effect can be obtained that the spacer 50 may be easily inserted into the space.

Figure 10:
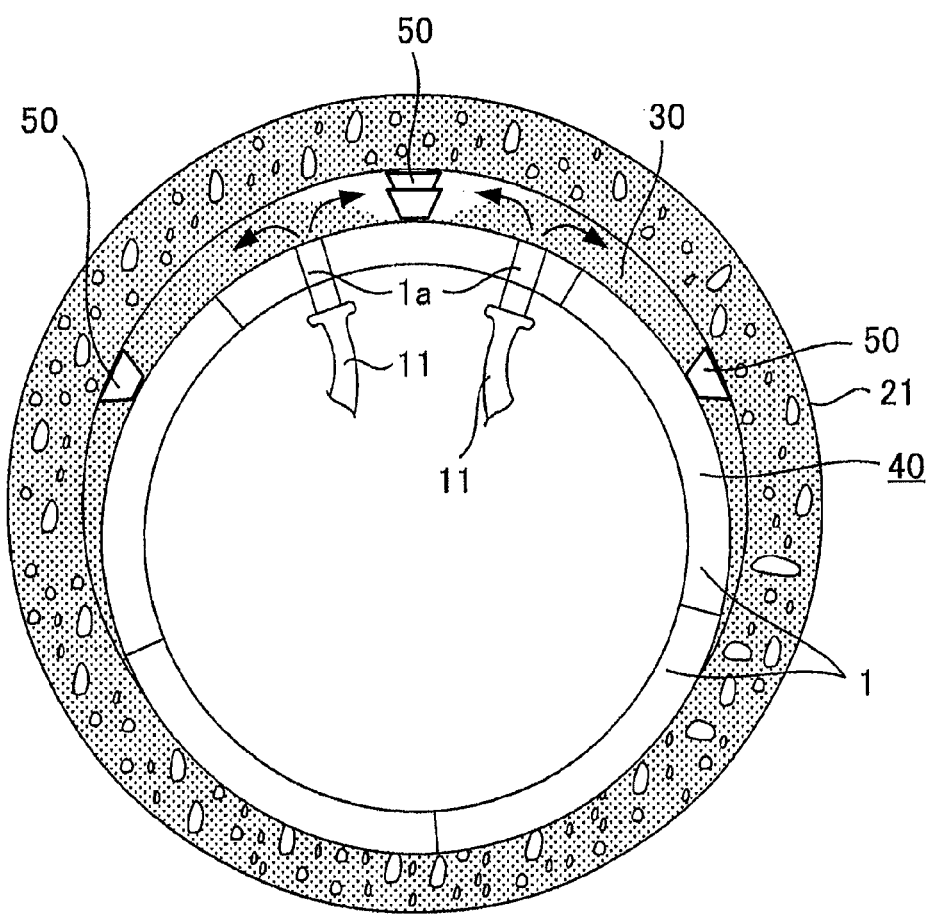
FIG. 10 is a cross-sectional view showing an appearance when a filling material is injected into a space between the outer circumference of the laid rehabilitating pipe and the inner wall surface of the existing pipe.

While the rehabilitating pipe 40 is being laid down, the positioning using the spacer or spacers as the above may be performed with every length of about 1 m for a plurality of the pipe units 10. After the laying down and positioning of the rehabilitating pipe 40 are completed over the entire length, pillars not shown may be placed in the rehabilitating pipe 40 to prevent deformation of the rehabilitating pipe 40 when the filling material below fills the spaces. The pillars may be placed both in the vertical and horizontal directions at an interval of about several meters. Thereafter, as shown in FIG. 10, the filling material 30 may fill the space between the inner wall surface of the existing pipe 21 and the outer circumference of the rehabilitating pipe 40 and spaces outside the inner surface plates 101 of the segment members 1 which constitute the rehabilitating pipe 40. The filling material 30 may comprise cement mortar, resin mortar of which the main material is epoxy resin, polyester resin or other resin, or other appropriate material. The filling may be performed through: forming holes 1a at appropriate locations of the upper side segment members 1 for every length of about several meters of the rehabilitating pipe 40; connecting hoses 11 for filling to the holes 1a; and injecting the filling material 30 from the hoses 11. Before the filling, spaces between outer circumferences of both ends of the entire length of the assembled rehabilitating pipe 40 and the inner wall surface of the existing pipe 21 may be closed using a sealing material of resin putty or mortar not shown.

The filling material 30 may also flow into the inside of the spaces 55 of the spacers 50 used for positioning the rehabilitating pipe 40 because the upper surface portions 51 of the spacers 50 are provided with the circular holes 511, and voids will not be formed in the spacers 50.

After the filling by the filling material 30 is accomplished and the filling material 30 is solidified to cure, the holes 1a may be closed using a sealing material, and the existing pipe renovation work is completed such as by removing the pillars not shown.

According to the working example as described above, by adjusting the number of spacers to be stacked in accordance with the size of the space between the outer circumference of the rehabilitating pipe 40 and the inner wall surface of the existing pipe 21, the positioning of the rehabilitating pipe 40 in the existing pipe 21 can be easily and appropriately performed in a short time during the existing pipe regeneration work. Moreover, during the operation of assembling the rehabilitating pipe 40 in the existing pipe 21, when the newly prepared pipe unit 10 is pushed into the existing pipe 21, the pipe unit 10 may not get stuck with the spacer 50 because the both end portions 53 and 54 in the longitudinal direction are cut off at an angle. Furthermore, the elongated shape of the spacer 50 itself can guide the motion of the pipe unit 10 being pushed into the existing pipe 21, and the rehabilitating pipe 40 can be smoothly assembled in the existing pipe 21.

In the structure of the spacer of the above-described working example, the shape of the space 55 provided in the bottom surface portion 52 may be a shape defined such that, when two or more spacers 50 are stacked on one another, the upper surface portion 51 of a spacer 50 located at the lower side can be fitted in the bottom surface portion 52 of another spacer 50 located at the upper side.

Alternatively or in addition, the end portion 54 may be provided with a connection boss 531, while the end portion 53 may be provided with a connection recess 541 having a shape in which the connection boss 531 can fit.

As will be understood, the spacer for positioning and the method of positioning using the spacer according to the present invention can be not only used for positioning of a rehabilitating pipe in an existing pipe renovation work but also widely used for positioning when the spacer is inserted into a space between a fixed object and another object which is to be subjected to the positioning.

DESCRIPTION OF REFERENCE NUMERALS

21 . . . Existing pipe
40 . . . Rehabilitating pipe
50 . . . Spacer
51 . . . Upper surface portion
  511 . . . Circular hole
52 . . . Bottom surface portion
  521 . . . Skirt member
53, 54 . . . End portion
  531 . . . Connection boss
  541 . . . Connection recess
55 . . . Space
551 . . . Reinforcement ribs

The invention claimed is:

1. A spacer for positioning a rehabilitating pipe in an existing pipe, the spacer being inserted into a space between the existing pipe and the rehabilitating pipe and adjusting a position of the rehabilitating pipe with respect to the existing pipe,
the spacer having an elongated shape with both end portions in a longitudinal direction thereof cut off at an oblique angle,
the spacer having a transverse width increasing gradually from an upper surface portion to a bottom surface portion and a space formed in the bottom surface portion to correspond to a shape of the upper surface portion, thereby allowing a plurality of spacers to be stacked on one another in a thickness direction thereof, and
the upper surface portion having a flat-plate shape with a flat rectangular surface region.

2. The spacer for positioning a rehabilitating pipe as recited in claim 1, wherein when a plurality of the spacers are stacked on one another in the thickness direction, the spacers are stacked such that skirt portions located at both end portions in the transverse direction of the bottom surface portion of a spacer at an upper side for positioning will cover the upper surface portion of a spacer at a lower side for positioning and at least a part of a side surface portion of the spacer at the lower side for positioning.

3. The spacer for positioning a rehabilitating pipe as recited in claim 1, wherein a direction in which one end portion of the both end portions in the longitudinal direction is cut off at an angle is parallel to a direction in which the other end portion of the both end portions is cut off at an angle.

4. The spacer for positioning a rehabilitating pipe as recited in claim 3, wherein:
a boss portion is formed on a cut surface of the one end portion; and
a recessed portion is formed at a cut surface of the other end portion to be fitted with the boss portion.

5. The spacer for positioning a rehabilitating pipe as recited in claim 1, wherein the oblique angles at both end portions are equal to one another.

6. The spacer for positioning a rehabilitating pipe as recited in claim 1, further comprising a reinforcement rib provided in the space and extending from the bottom surface portion.

7. The spacer for positioning a rehabilitating pipe as recited in claim 6, wherein the reinforcement rib comprises a longitudinal rib extending from the both end portions and along a central axis with respect to a transverse direction of the spacer.

8. The spacer for positioning a rehabilitating pipe as recited in claim 7, further comprising a plurality of transverse ribs provided in the space in a direction orthogonal to the longitudinal rib.

9. The spacer for positioning a rehabilitating pipe as recited in claim 1, wherein the upper surface portion is formed with a plurality of holes passing through the bottom surface portion so as to communicate the upper surface portion with the bottom surface portion.

10. The spacer for positioning a rehabilitating pipe as recited in claim 1, further comprising two skirt members extending downward from the upper surface portion such that the space is surrounded by the upper surface portion and the skirt members, the skirt members extending from the upper surface portion in a direction in which the skirt members are slanted at the corresponding oblique angle.

11. The spacer for positioning a rehabilitating pipe as recited in claim 10, wherein the oblique angles of the skirt members are equal to one another.

12. The spacer for positioning a rehabilitating pipe as recited in claim 10, further comprising a boss portion extending from one of the skirt members and a recessed portion formed in the other of the skirt members.

13. A spacer for positioning a rehabilitating pipe in an existing pipe, the spacer comprising: a body having opposite ends, an upper surface portion in the form of a flat-plate shape with a flat rectangular surface region, a lower surface portion, two skirt members disposed at the respective opposite ends and extending from the upper surface portion at respective oblique angles to provide a space surrounded by the lower surface portion and the two skirt members, at least one reinforcement rib provided in the space and extending from the lower surface portion, a boss portion extending from one of the two skirt members, and a recessed portion formed in the other of the two skirt members.

14. The spacer according to claim 13, wherein the body comprises an elongated body having a transverse width increasing gradually from the upper surface portion to the lower surface portion.

15. The spacer according to claim 13, wherein the space has a shape such that a trapezoidal column inside the spacer is removed from a side of the lower surface portion.

16. The spacer according to claim 13, wherein the at least one reinforcement rib comprises a longitudinal rib extending from one of the opposite ends to the other of the opposite ends and plurality of transverse ribs orthogonal to the longitudinal rib.

17. A plurality of spacers for positioning a rehabilitating pipe in an existing pipe, the plurality of spacers being inserted in stacked relationship into a space between the existing pipe and the rehabilitating pipe to adjust a position of the rehabilitating pipe with respect to the existing pipe, each of the spacers comprising:

a body having opposite ends, an upper surface portion in the form of a flat-plate shape with a flat rectangular surface region, a lower surface portion, two skirt members disposed at the respective opposite ends and extending from the upper surface portion at respective oblique angles, and a longitudinal rib extending from the lower surface portion, the lower surface portion being provided with a space having a shape corresponding to the upper surface portion so that when two of the plurality of spacers are stacked on one another between the existing pipe and the rehabilitating pipe, the upper surface portion of one of the two spacers is fitted in the space of the other of the two spacers, the upper surface portion and skirt members of the other of the two spacers cover the upper surface portion of the one spacer, inner surfaces of the skirt portions of the other spacer contact outer surfaces of the skirt portions of the one spacer, and the upper surface portion of the one spacer is in contact with the reinforcement rib of the other spacer.

18. The plurality of spacers according to claim 17, wherein each of the spacers has a boss portion extending from one of the two skirt members and a recessed portion formed in the other of the two skirt members; and wherein when the two spacers are stacked on one another, the boss portion of the other spacer is fitted in the recessed portion of the one spacer.

19. The spacer according to claim 17, wherein each of the plurality of spacers has a plurality of transverse ribs orthogonal to the longitudinal rib.

20. The spacer according to claim 17, wherein the body of each of the plurality of spacers comprises an elongated body having a transverse width increasing gradually from the upper surface portion to the lower surface portion.

\* \* \* \* \*